Nov. 14, 1933.  J. J. MOORE  1,935,126

TORPEDO

Filed June 7, 1920  2 Sheets-Sheet 1

Inventor
John J. Moore
By R. W. Blair
Attorney

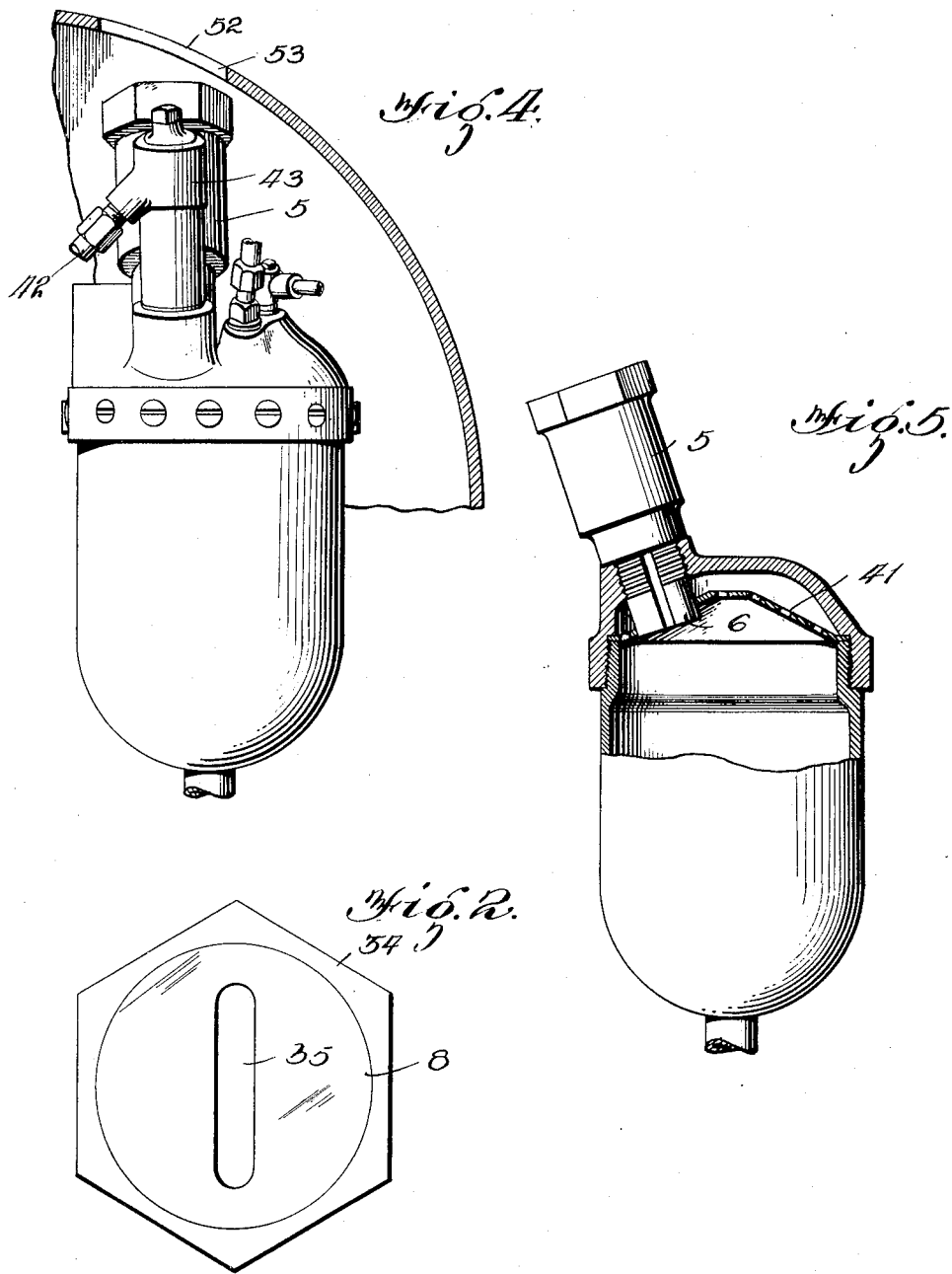

Patented Nov. 14, 1933

1,935,126

UNITED STATES PATENT OFFICE 1,935,126

TORPEDO

John J. Moore, Newport, R. I., assignor to the Government of the United States

Application June 7, 1920. Serial No. 387,153

6 Claims. (Cl. 60—44)

This invention relates to torpedoes and more particularly to the superheating apparatus of the automobile type of torpedo.

This invention has for one of its chief objects the providing for a combination of functions of the present fuse and pistol used in automobile torpedoes, into one unit, with a view to greater efficiency in operation.

Another object is to eliminate the use of corrosive materials, thereby conforming to the approved torpedo policy in this respect.

Another object is the elimination of springs, with a view to minimizing mechanical unreliability.

Another object is the retention of metallic protecting seals for the protection of the fuse composition charges from atmospheric and other disturbing agencies.

Another object is to secure a longer interval of fuse burning, and a higher calorific value during such interval for ignition or re-ignition of fuel, when functioning in the combustion pot of an automobile torpedo.

A further feature is that the combination double fuse-pistol can after the firing of the charge, be re-charged with an ignition cap and fuse composition and indefinitely re-used.

Another object is to eliminate high pressure air leakage past the fuse seat, the pistol being operated by a reduced and low pressure air supply from the combustion pot.

Another object is to obtain slight delay on firing the fuse thus allowing time for the entry of fuel into the combustion pot.

While in this description I have referred to the use and adaptation of the invention in connection with certain automobile torpedoes, it should be understood that in its essential features, the device may be adapted for all types of torpedoes.

Reserving the right to resort to such changes in construction as come within the scope of the claims, and with the foregoing and other objects in view, the invention consists in the novel construction, combination and arrangement of elements hereinafter described and claimed.

In order that my invention may be more fully understood, reference will be made to the accompanying drawings, in which like parts are similarly designated, and in which, Figure 1 is a longitudinal sectional view through the combined double fuse-pistol, as constructed in accordance with this invention.

Figure 2 is an end view thereof.

Figure 4 is a midship sectional view of the torpedo shell and fuse holder and pistol as at present used in the Bliss-Leavitt type of automobile torpedo.

Figure 5 is a side cross sectional view of the combustion pot, showing internally, the baffle plate and the position of my device.

Figure 1:
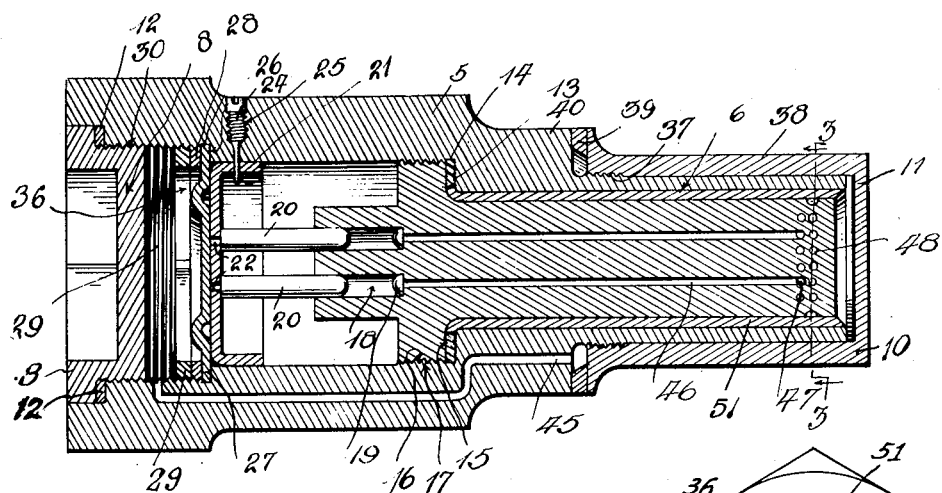
Figure 6:
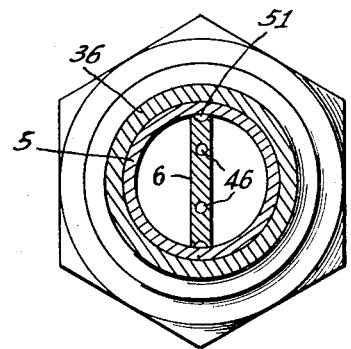
Figures 6 and 7 are cross sectional views taken on Fig. 1.

The device may be constructed of any suitable material, but preferably of steel and of any desired form as represented conventionally in Figure 1.

In the present embodiment of this invention, 5 designates the case or cylinder, 6 the ignition partition, 20 the firing pins, 8 the air chamber nut, 38 the protector cap, 11 the metallic seal, and 12 the packings; all shown on accompanying drawings for purposes to be hereinafter set forth.

Case or cylinder 5 is provided internally with a shoulder 13 on which is placed a non-metallic packing washer 14, which effects an air tight joint between this shoulder and the part 6 when the external thread 16 of ignition partition 6 is engaged and screwed down firmly into the interior thread 17 of case 5. The firing pin guideways 18 accommodate the seating in each of one non-mercuric ignition percussion cap 19.

The two firing pins 20 are assembled on a piston 21 by means of the threaded ends of the firing pins 20 engaging threaded holes 22 in the piston 21, which is also provided with an aperture for the reception of the internally projecting end of a safety pin 24 when screwed into a partly threaded aperture 25 in the case 5.

When the upper surface of the assembled piston 21, carrying the firing pins 20, is flush with the shoulder 26, and the safety pin 24 engaged with piston to hold it in inoperative position, a leather diaphragm 27 is inserted and laid on the shoulder 26 on top of which is placed a washer 28; the thread of a retaining ring 29 is engaged with an interior thread 30 and screwed down firmly pressing the washer 28 against the leather diaphragm 27.

A non-metallic packing washer 12 is placed on an outer shoulder of case 5 to provide an air tight joint when the nut 8 is firmly screwed into thread 30 of case 5, thus forming a dome for the air chamber and an air tight seal for firing mechanism.

Figure 3:
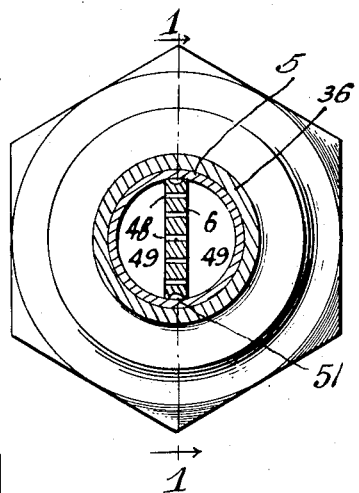
Figure 3 is a sectional view on line 3—3 of Figure 1 with the protector cap removed.
Figure 7:
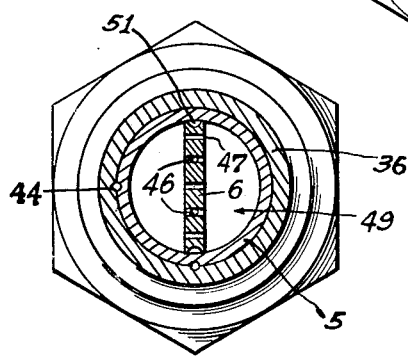

The case 5 is provided with a hexagonally formed head flange 34, Figure 3, for affording facility for use with manipulating tools when assembling with the combustion pot. There is also provided an oval slot 35 in the nut, Figure 2, for receiving a tool when the parts are being assembled.

The metallic seal 11 is a disc of lead-tin-bismuth alloy melting when exposed to 150° F. and may be secured to the case 5 as shown in Figure 1 with sufficient lead-tin alloy solder melting at 212° F. to hold the parts in place.

The exterior thread 37 of case 5 is provided for assembly with the thread of the combustion flask; and when not assembled with the combustion flask it is also used for the purpose of accommodating a protector cap 38 which is threaded interiorly thereof as shown in Figure 1, and is screwed firmly up to packing ring 39, which is a loose soft metal washer, thereby making a tight joint between the protector cap and a shoulder 40. The protector cap 38 prevents atmospheric and other disturbing agencies from affecting the metallic seal 11 and the fuse composition charges when not assembled in the torpedo. The soft metal washer 39 is retained when the fuse-pistol is to be assembled for use in the combustion pot thereby providing an air tight packing between the shoulder 40 and top of combustion pot.

In adapting my device particularly to the Bliss-Leavitt type of automobile torpedo, the changes necessary to their present assembly may be noted from Figures 4 and 5, and include an enlargement of the diameter of hole 53 as shown in Figure 4, about 1 inch, and the enlargement of hole in a baffle plate 41 shown in Figure 5, from .625" to .927" is necessary.

My invention which obtains its operative energy from the reduced pressure of combustion pot, requires no special exterior air supply through exposed external portion of the fuse-pistol. Special external air supply is shown in Figure 4 as inlet 42, which is required for operation of the present Bliss-Leavitt types of fuse-pistol. Therefore, in order to adapt my device to the Bliss-Leavitt type of torpedo, I remove that part of the present air supply 42 required in the operation of the Bliss-Leavitt type of high and low pressure superheater fuse pistols, and the part 43 of the pistol casing and fuse holder; this would require the blanking off or removal of the air supply piping to the supply connection shown in Figure 4, as 42.

In Figure 5, my device is shown as adapted to the combustion pot of the Bliss-Leavitt type of torpedo, the only changes necessary being described above.

The functioning and purpose of the above described device is as follows:—

The reduced air pressure of the combustion pot enters through channels 44, Figure 3, cut in the coacting threads to an apertured interior air duct 45, thence to chamber 36, thus downwardly compressing the leather diaphragm 27 to the allowance of a circular fold of ¼" shown thereon. When pressure has become intensified to 150 lbs. per sq. in. or over; the force of this pressure exerted by the leather diaphragm on the immediately adjacent piston shears the safety pin 24 holding the piston and firing pins 20 inoperative, allowing the firing pins to fall against and fire the percussion caps 19 from which a flame is conveyed through flash conduits 46 to flash hole outlets 47, through which it passes to ignite the columns of fuse composition 49, Figure 3, that are arranged on either side of the partition 6 and that are of suitable consistency to provide a fuse with a burning rate of 60 seconds in the atmosphere. The heat from the columns of ignited fuse composition frees the metallic seal 11 which when removed allows the fuse device to furnish flame and heat to the interior of the combustion pot to ignite the fuel entering therein and thus insure the functioning of the torpedo.

The ignition partition 6 is provided with two guide ways 18 for firing pins, flash conduits for transmittal of the flash from the percussion caps and flash hole outlets 47 at the lower end of the flash conduits for passage of the flame to the ignition charge.

It is very desirable that the fuse composition on both sides of the partition should be ignited simultaneously and adjacent to the end where the flash outlets are situated. This, however, may not always occur because the flame issuing from the flash outlet to one side of the partition may not be sufficient to ignite the composition on that side. To overcome such a disadvantage the partition is provided with a plurality of transverse apertures 48 adjacent to the end where the flash outlets are situated. These apertures permit the burning composition on one side of the partition to ignite the composition on the other side, thus producing an even burning of the two columns of composition. Occasionally it does happen that even this means does not prevent only one column of fuse composition from burning. Therefore, to eliminate the possibility of the ignited column from burning back and igniting the other column of composition remote from the flash outlet end of the case, the partition is further provided with recesses 50 on the edges contacting with the wall of the case 5 to accommodate an asbestos packing 51. This packing effectually insulates one side of the partition from the other, thereby preventing ignition of either column of fuse composition as a result of the burning of the other except through the flash outlets or transverse apertures.

Thus it will be seen that my invention provides for a much larger explosive charge than at present used in the fuses for this purpose and assures a much longer interval of fuse burning in the combustion pot of a torpedo.

It will also be noted that the one unit structure, or combination of the present separately defined fuse and pistol, now used eliminates the possibility of error in assembly and adjustment in the hands of the user.

I am aware that many changes in the general construction and arrangement of my invention can be made without departing from the spirit thereof and I do not, therefore, limit my invention to the particular embodiment thereof as here shown for the purpose of illustration, except as I may be limited by the hereto appended claims forming a part hereof.

I claim:

1. In a device of the character described, in combination, a pistol, a fuse composition, firing means for said fuse composition and a metallic seal over the end of said fuse composition adapted to melt when the heat generated by the fuse composition reaches a sufficiently high degree.

2. In a device of the character described, in combination, a casing, a removable cap at the end of said casing, a fuse composition within the casing, a metallic seal normally closing and protecting said fuse composition and firing means adapted to ignite said fuse composition.

3. In a device of the character described, in combination, a casing, a removable cap at the end of said casing, a fuse composition within the casing, a metallic seal normally closing and protecting said fuse composition, firing means adapted to ignite said fuse composition, said casing having a passage communicating with the interior of the combustion flask whereby the low pressure air is adapted to actuate said firing mechanism.

4. In a device of the character described, in combination, a casing, a removable cap at the end of said casing, a fuse composition within the casing, a metallic seal normally closing and protecting said fuse composition, firing means adapted to ignite said fuse composition, said casing having a passage communicating with the interior of the combustion flask whereby the low pressure air is adapted to actuate said firing mechanism and means normally holding said firing mechanism in safety position.

5. In a device of the character described, in combination, a casing, a partition therein dividing its chamber into a plurality of compartments, a fuse composition in each compartment, percussion caps mounted within the partition, a piston operable within the casing, firing pins carried by the piston and adapted to ignite the caps, means for normally holding the piston and pins remote from the caps, passageways in the partition to conduct a flash from the caps to the composition, and passageways in the casing for directing low pressure air in a combustion flask to actuate the piston.

6. In a device of the character described, in combination, a casing, a partition therein dividing its chamber into a plurality of compartments, a fuse composition in each compartment, percussion caps mounted in the partition, a piston operable in the casing, firing pins carried by the partition and adapted to ignite the caps, means for normally holding the piston and pins remote from the caps, heat resisting material on the edges of the partition to insulate one compartment from the other, passageways in the partition to conduct a flash from the caps to the composition, and passageways in the casing to conduct the low pressure air in a combustion flask to actuate the piston.

JOHN J. MOORE.